May 22, 1951 — A. T. SCHEIWER — 2,553,680
VALVED PIPE COUPLING
Filed Dec. 6, 1947 — 3 Sheets-Sheet 2

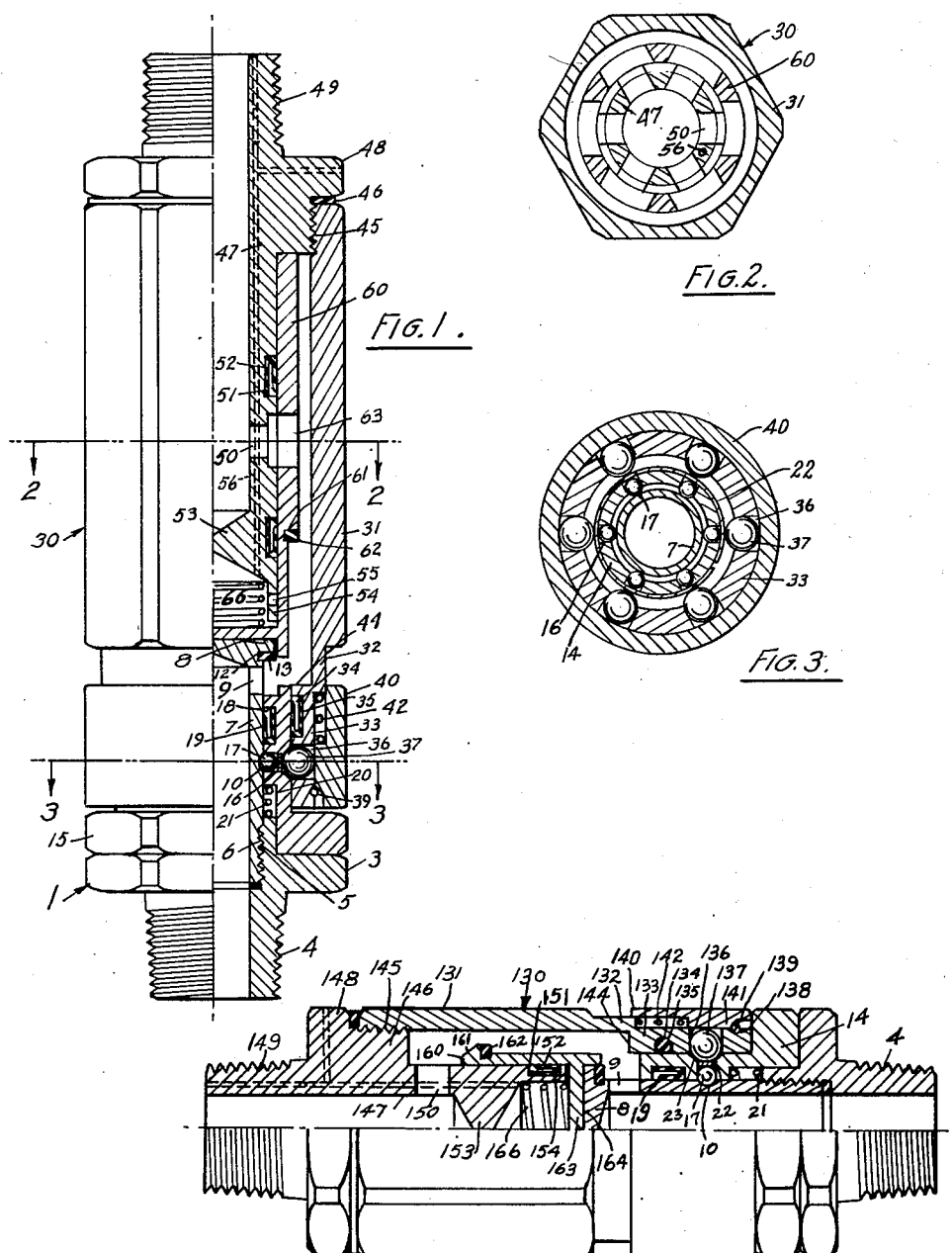

Inventor
Albert T. Scheiwer
By Florian G. Miller
Attorney

May 22, 1951 A. T. SCHEIWER 2,553,680
VALVED PIPE COUPLING
Filed Dec. 6, 1947 3 Sheets-Sheet 3
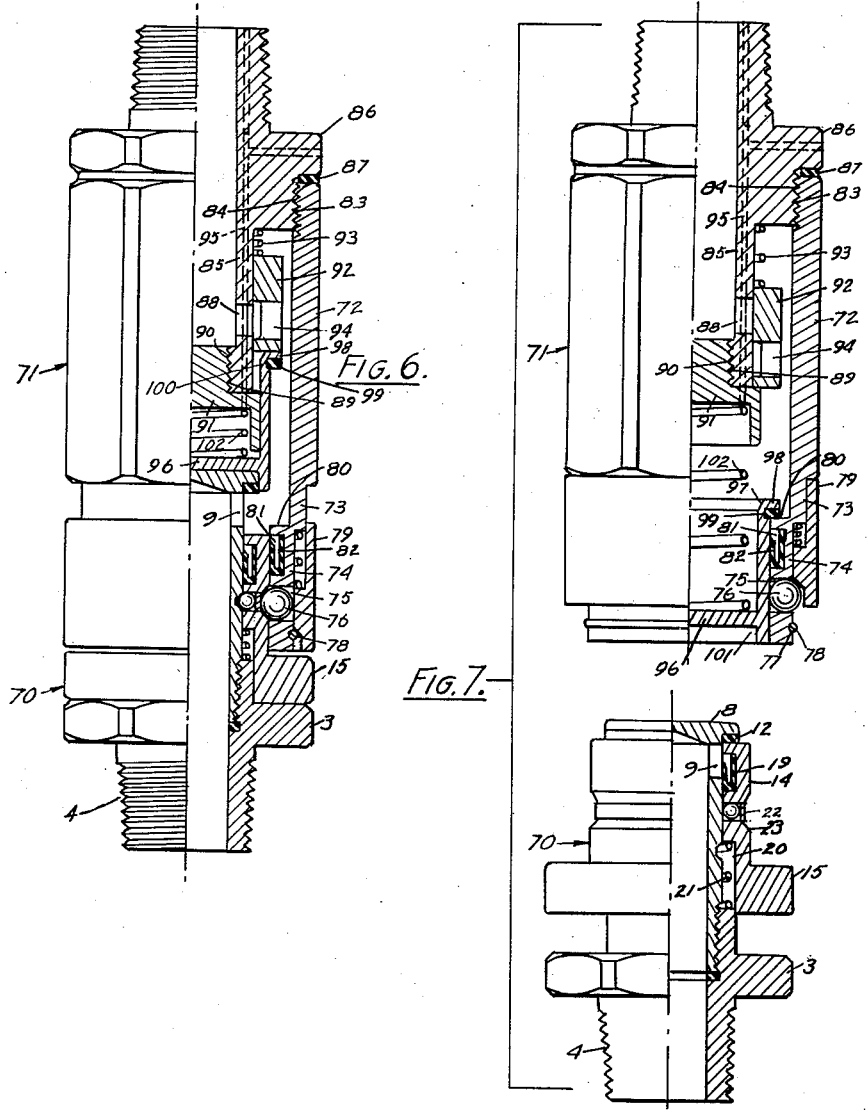
Inventor
Albert T. Scheiwer
By
Florian F. Miller
Attorney Patented May 22, 1951

2,553,680

UNITED STATES PATENT OFFICE 2,553,680

VALVED PIPE COUPLING

Albert T. Scheiwer, Erie, Pa.

Application December 6, 1947, Serial No. 790,119

16 Claims. (Cl. 284—19)

This invention relates generally to couplings for hose lines and more particularly to quickly attachable and detachable couplings for hose lines having fluid and dirt sealing means in the male and female members for sealing each of the coupling members upon disconnection thereof.

Couplings having longitudinally movable check valves are usually so constructed that the check valves cock or become wedged in the male or female coupling member thereby destroying the seal upon the disconnection of the coupling member. These prior coupling members have not provided means for connecting the male coupling member to the female coupling member by mere insertion of the connecting portion of the male coupling member to the female coupling member. Furthermore prior couplings of this type have provided no means for keeping dust and dirt out of the coupling when the male and female coupling members are disconnected. Also fluid gets trapped in these prior coupling members thereby making it impossible to make a connection therebetween. It has also heretofore been necessary to have a comparatively long male and female coupling member to house the check valves therein.

It is, accordingly, an object of my invention to overcome the above and other defects in couplings having check valves therein and it is more particularly an object of my invention to provide a coupling having check valves therein which is simple in construction, economical in cost, economical in manufacture, efficient in operation, and easy to operate.

Another object of my invention is to provide vent means in the female coupling member when it is disconnected from the male coupling member.

Another object of my invention is to provide novel means for sealing the male and the female coupling members upon disconnection thereof.

Another object of my invention is to provide a dirt and dust seal for coupling members.

Another object of my invention is to provide novel check valves for coupling members.

Another object of my invention is to materially shorten male and female coupling members with check valves therein.

Another object of my invention is to provide a coupling which is particularly adaptable for use with vacuum.

Another object of my invention is to provide a check valve in a female coupling member which is utilized to hold camming members in the path of a camming sleeve whereby the male member may be inserted and locked in the female member without manual operation of the camming sleeve.

Other objects of my invention will become evident from the following detailed description, taken in conjunction with the accompanying drawings, in which Fig. 1 is a side elevational view with one side thereof broken away on the axial center line, of my novel coupling in a locked position;

Fig. 2 is a view taken on the line 2—2 of Fig. 1;

Fig. 3 is a view taken on the line 3—3 of Fig. 1;

Fig. 6 is a side elevational view, with one side thereof broken away on the axial center line, of a modified form of my coupling in a locked position;

Fig. 7 is an exploded view with one side thereof broken away on the axial center line, of the male and female coupling members shown in Fig. 6; and Fig. 8 is a side elevational view of another modified form of my invention in a locked position.

Figure 4:
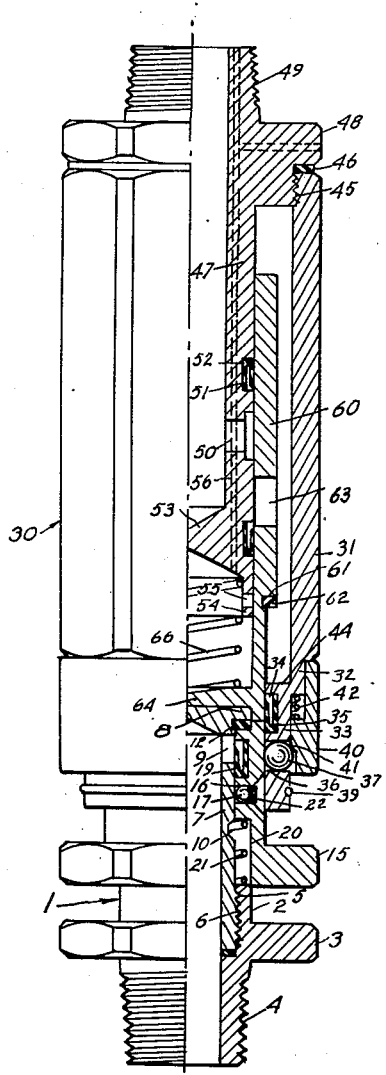
Fig. 4 is a side elevational view with one side thereof broken away on the axial center line showing the male coupling member partially inserted into the female coupling member.

Referring now to the drawings, I show in Figs. 1 to 5 inclusive a male coupling member 1 comprising a cylindrical shell 2 having an outwardly extending wrench engaging portion 3, a threaded portion 4 for connection to any suitable hose line, and an internally threaded portion 5 for threadable engagement with the threaded end 6 of a stationary sleeve 7. The sleeve 7 has an outwardly directed end flange 8, laterally extending apertures 9 and a peripheral groove 10. A ring washer 12 is disposed adjacent the flange 8 of the sleeve 7 for sealing engagement with the L-shaped groove 13 in the forward end of locking and sealing sleeve 14 when the male coupling member 1 is disconnected as in Fig. 5. The locking sleeve 14 has an outwardly extending wrench engaging portion 15, cam or ball retaining apertures 16 for retaining camming members such as balls 17, an internal peripheral groove 18 for receiving a washer 19 and an L-shaped groove 20 for nesting a spring 21 which urges the sleeve 14 into sealing engagement with the washer 12 and the laterally extending aperture 9 of the sleeve 7. A flat annular spring 22 is disposed in tapered groove 23 for retaining the balls 17 in the ball retaining apertures 16 and for urging them inwardly into the peripheral groove 10 of the sleeve 7.

Figure 5:
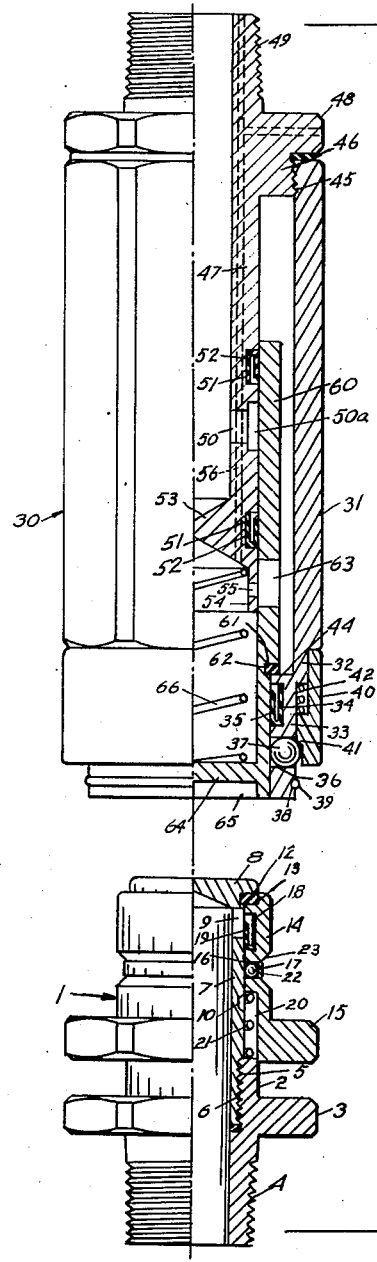
Fig. 5 is a side elevational exploded view with parts thereof broken away of the male and female coupling members of my novel coupling.

The female member 30 comprises a cylindrical shell 31 having stepped reduced portions 32 and 33, an internal peripheral groove 34 for receiving a washer 35, ball retaining apertures 36 for receiving camming members or balls 37, and a spring clip groove 38 for nesting a spring clip 39 for limiting and stopping the longitudinal movement of a locking sleeve 40 which moves over the reduced portion 33 of the member 31. The locking sleeve 40 has a camming portion 41 for engaging the balls 37 and a spring member 42 urges the camming portion 41 of the locking sleeve 40 into locking engagement with the balls 37 to urge them into the groove 23 in the sleeve 14 and into engagement with the spring 22 whereby the balls 17 are locked in the groove 10 on the sleeve 7 as in Fig. 1. The shell 31 has an internal shoulder 44 and an internally threaded portion 45 on the end thereof for threadably engaging the enlarged threaded portion 46 of a concentrically disposed cylindrical member 47. The cylindrical member 47 has an outwardly extending wrench engaging portion 48, a threaded portion 49 for threadably engaging a hose coupling or the like, laterally outwardly extending apertures 50 with counterbores 50a, peripheral washer grooves 51 for receiving washers 52, a wall portion 53, an outwardly extending portion 54 having a laterally extending aperture 55 and a venting aperture 56. A movable sleeve 60 is telescopically disposed on the cylindrical member 47, and has a shoulder 61 with an adjacently disposed ring washer 62, laterally extending apertures 63 adapted to register with the apertures 50 in the cylindrical member 47 when the male and female coupling members 1 and 30 are connected together as shown in Fig. 1, and with the apertures 55 when the coupling members 1 and 30 are disconnected as shown in Fig. 5, a transverse wall 64 and a recessed portion 65 for nesting the end of the flanged portion 8 of the male member 1. Spring 66 urges the washer 62 on the movable sleeve 60 into sealing engagement with the shoulder 44 of the outer shell 31.

In operation, the locking sleeve 40 is moved longitudinally against the force of the spring 42 to permit the balls 37 to move outwardly in the ball retaining apertures 36. The sleeve 14 of the male member 1 is then inserted into the female member 30, the flanged nose portion 8 nesting in the recessed portion 65 of the movable sleeve 60. By moving the male member 1 inwardly, the sleeve 60 is moved longitudinally against the force of the spring 66 until the balls 37 engage the peripheral groove 23 on the sleeve 14 of the male member 1 and spring 22 to urge the balls 17 carried by the sleeve 14 into locking engagement with the peripheral groove 10 on the sleeve 7. After the male member 1 is inserted into the female member 30 a predetermined distance, the flange nosed portion 8 moves out of sealing engagement with the sleeve 14 thereby unsealing the laterally extending aperture 9 in the sleeve 7 to permit flow of fluid. The washer 62 on the sleeve 60 is pushed rearwardly away from the shoulder 44 a sufficient distance to permit the flow of fluid through member 7, laterally extending aperture 9 therein, and through the registered apertures 63 and 50 in the movable sleeve 60 and the cylindrical member 47 respectively.

Upon disconnection of the coupling, the locking sleeve 40 is moved out of engagement with the balls 37 thereby permitting the male member 1 to be moved outwardly from the female member 30 wherein the washer 12 sealingly engages the spring-urged sleeve 14 and the washer 62 on the movable sleeve 60 sealingly engages the shoulder 44 of the cylindrical shell 31. When the female member 30 is disconnected, the aperture 63 in the movable sleeve 60 registers with air vent 55 which is vented to atmosphere through venting aperture 56. The venting aperture 56 may be drilled or provided in any other suitable way. When the female member is in a disconnected position as shown in Fig. 5, the camming or locking sleeve 40 is held against the force of the spring 42 by the ball members 37 which are forced outwardly by the reduced end of the movable sleeve 60. It will thus be seen that it is merely necessary to insert the male member 1 into the female member 30 and the coupling members 1 and 30 lock together automatically without manual intervention.

The modified form of my coupling shown in Figs. 6 and 7 operates substantially the same as my novel coupling shown in Figs. 1 to 5 inclusive, except for a few slight changes in the movable sleeve in the female member. The male member 70 is exactly the same as the male member shown in Figs. 1 to 5 inclusive. The female member 71 comprises an outer shell 72 having stepped portions 73 and 74, ball retaining apertures 75 for retaining balls or camming members 76, a peripheral groove 77 for receiving a spring clip 78 to limit the longitudinal movement of a locking sleeve 79, an internal shoulder 80, an internal peripheral washer groove 81 for receiving a washer 82, and an internally threaded portion 83 for threadably engaging enlarged threaded portion 84 of a concentrically disposed cylindrical member 85. The cylindrical member 85 has an enlarged wrench engaging portion 86 in sealing engagement with a washer 87, laterally extending apertures 88, and an internally threaded portion 89, for threadably engaging the threaded portion 90 of an L-shaped member 91. A sleeve 92 is telescopically disposed on the cylindrical member 85 and is urged against the L-shaped member 91 by spring 93. The sleeve 92 has a laterally extending aperture 94 for registration with the laterally extending aperture 88 in the cylindrical member 85. The cylindrical member 85 has a venting aperture 95 extending therethrough. A cup-shaped sleeve 96 has a chamfered internal portion 97, an outwardly directed flange portion 98, and a washer 99 in a groove 100 adjacent to flange portion 98 to sealingly engage the shoulder 80 in the outer shell 72. Cup-shaped member 96 has a depressed portion 101 in the end thereof for nesting the flanged end 8 of the male member 70. Spring 102 urges the cup-shaped member 96 to a position shown in Fig. 7 wherein the washer 99 sealingly engages the shoulder 80 of the shell 72.

When the male and female coupling members 1 and 70 are disconnected as shown in Fig. 7, the washer 99 on the cup-shaped member 96 is urged to sealing relationship with the shoulder 80 of the shell 72 by spring 102 thereby sealing the coupling from dust and dirt and also sealing the fluid therein. The interior of the coupling between the cylindrical member 85 and the outer shell 72 is vented to atmosphere by the vent 95 in the cylindrical member 85. In the disconnected position, the aperture 94 in the sleeve 92 is urged out of registry with the aperture 88 in the cylindrical member 85 thereby sealing the aperture 85 to the flow of fluid.

On connection of the coupling members 70 and 71, the male member 70 operates the same as the male member 1 shown and described in Figs. 1 to 5 inclusive wherein the spring 22 urges the balls 76 into locking engagement with the groove 23 in the sleeve 7 of the male member 70. The flange portion 8 of the sleeve 7 of the male member 1 nest in the depressed portion 101 of the cup-shaped member 96 and forces it rearwardly to a position shown in Fig. 6 a predetermined distance from the shoulder 80 of the shell 72 thereby permitting flow of fluid through the laterally extending apertures 9 in the sleeve 7 of the male member 1. When the cup-shaped member 96 is forced to its ultimate inward position, the sleeve 92 is also forced rearwardly wherein the aperture 94 therein registers with the laterally extending aperture 88 in the cylindrical member 85 thereby permitting flow of fluid between the male member 70 and the female member 71 and vice versa. It will be apparent that the operation of the male member 70 and female member 71 as shown in Figs. 6 and 7 is substantially the same as the operation of my novel coupling shown in Figs. 1 to 5 inclusive.

Fig. 8 shows another modification of the female coupling member of my novel coupling whereby the fluid in the female coupling member is disposed in all portions thereof at all times. The female coupling member 130 shown in Fig. 8 comprises an outer cylindrical shell 131 having reduced step portions 132 and 133, an internal peripheral groove 134 for receiving a washer 135, ball retaining apertures 136 for receiving camming or ball members 137, a spring clip groove 138 for nesting a spring clip 139 for limiting and stopping the longitudinal movement of a camming or locking sleeve 140 which moves over the reduced portion 133 of the shell 131, and an internally threaded portion 145. The camming or locking sleeve 140 has a camming portion 141 for engaging the balls 137 and a spring member 142 urges the camming portion 141 of the locking sleeve 140 into locking engagement with the balls 137 to urge them into the groove 23 in the sleeve 14 and into engagement with the spring 22 of the male member 1 whereby the balls 17 of the male member 1 are locked into the groove 10 on the sleeve 7 as shown in Fig. 1. The cylindrical shell 131 has an internal shoulder 144. The internally threaded portion 145 on the end thereof threadably engages the enlarged threaded portion 146 of a concentrically disposed cylindrical member 147. The cylindrical member 147 has an outwardly extending wrench engaging portion 148, a threaded portion 149 for threadably engaging a hose coupling or the like, laterally outwardly extending apertures 150, a peripheral washer groove 151 for receiving washer 152, a wall portion 153 and an outwardly extending portion 154. A movable cup-shaped sleeve 160 is telescopically disposed on the cylindrical member 147 and it has a shoulder 161 with an adjacently disposed ring washer 162 for sealing engaging the shoulder 144 of the outer shell 131. The movable sleeve 160 has an end wall 163, and a depressed portion 164 for nesting the end of the flange portion 8 of the male member 1. Spring 166 urges the washer 162 on the movable sleeve 160 into sealing engagement with the shoulder 144 of the outer shell 131.

When the female coupling member 130 shown in Fig. 8 is disconnected, the fluid is sealed therein by the sealing engagement of the washer 162 on the movable sleeve 160 with the shoulder 144 of the outer shell 131 through the force of the spring 166. Upon insertion of the male member 1 into the female member 130, the sleeve 160 is forced to the rear until the end thereof clears the shoulder 144 of the outer shell 131 thereby permitting flow of fluid through the laterally extending apertures 9 in the male member 1 and through the laterally extending apertures 150 in the cylindrical member 147 and vice versa. In the operation of this modified form of coupling, the male member operates identically the same as has heretofore been described.

It will be evident from the foregoing description that I have provided a novel coupling which is especially adapted for vacuum because the sleeve 14 moves on the outer side of the sleeve 7 of the male member 1 and it is not necessary for a spring-urged check valve within the male member to work and sealingly engage the end thereof as in previous couplings. I have further provided venting means which leave the female coupling member free from locked fluid at all times thereby permitting easy connection of the male and female members. All parts of my novel coupling members are simple and the lengths thereof have been materially shortened and considerable material is saved. Likewise my novel coupling permits a maximum flow of fluid therethrough upon connection thereof. Suitable sealing means are provided at all points of my novel coupling. Furthermore, I provide means for sealing out all dirt, dust and the like from my novel coupling when they are in a disconnected position which is very important in utilizing the coupling between a truck and a trailer wherein the coupler is exposed to road dust, dirt and the like. Furthermore, connection between the coupling members may be made by merely inserting the male member into the female member.

Various changes may be made in the specific embodiment of my invention without departing from the spirit thereof or from the scope of the appended claims.

What I claim is:

1. A coupling comprising a female member; and a male member comprising a cylindrical member with an end flange and a laterally extending aperture, a spring-urged sleeve movable over said aperture for sealing engagement therewith and with said end flange of said cylindrical member when said male member is disconnected from said female member, means in said female member for moving said sleeve in said male member out of sealing engagement with the aperture in said cylindrical member, cam means for locking said sleeve in a predetermined position when engaged, and means for connecting said male and female members together.

2. A coupling as set forth in claim 1 wherein said means for locking said movable sleeve on the cylindrical member of said male member a predetermined distance from the end flange thereof comprises a peripheral groove on said cylindrical member and camming members carried by said movable sleeve adapted to engage said groove when said male member is inserted into said female member.

3. A coupling as set forth in claim 2 wherein a flat circular spring is disposed over said ball members retained by said sleeve.

4. A coupling comprising a male member having a connecting portion and a female member comprising a cylindrical shell having an internal shoulder, a cylindrical member disposed concentrically of said shell having a laterally extending aperture, a spring-urged movable sleeve adapted to sealingly engage said shoulder when said female member is disconnected and having a laterally extending aperture adapted to register with the aperture in said cylindrical member when said male and female coupling members are connected together for the flow of fluid, and means for connecting said male and female members together.

5. A coupling as set forth in claim 4 wherein said cylindrical member has a venting aperture adapted to vent the portion of said coupling between said outer shell and said inner cylindrical member to atmosphere when said female coupling member is disconnected.

6. A coupling as set forth in claim 5 wherein said movable sleeve is cup-shaped and telescopically disposed on said cylindrical member and a spring is disposed between said sleeve and the end of said cylindrical member.

7. A coupling comprising a male member having a connecting portion with a laterally extending aperture, a sleeve movable over said laterally extending aperture, and means for locking said sleeve in a position out of sealing engagement with said laterally extending aperture when said male member is connected to a female member, and a female member comprising an outer shell, an inner concentrically disposed, cylindrical member having a laterally extending aperture, a cup-shaped, telescopically disposed sleeve on said cylindrical member having an aperture, a spring between said cylindrical member and said movable sleeve adapted to move said movable sleeve into sealing engagement with the end of said cylindrical shell, said male member being adapted to move said aperture in said movable sleeve in said female member to a position in registry with the aperture in said cylindrical member when said male and female coupling members are connected together, and means for connecting said male and female coupling members together.

8. A coupling as set forth in claim 7 wherein venting means are provided for venting the portion of said female coupling member between said outer shell and said inner cylindrical member to atmosphere when said female coupling member is disconnected.

9. A coupling comprising a male member having a connecting portion, and a female member comprising an outer shell, an inner shell with a laterally extending aperture, a sleeve telescopically disposed on said inner shell having an aperture, a spring-urged, cup-shaped sleeve adapted to sealingly engage the end of said outer shell when the coupling is disconnected and adapted to telescope on said inner shell when said male and female members are connected together, said apertures in said sleeve and said inner shell adapted to register when said male and female members are connected together and means for connecting said male and female members together.

10. A coupling as set forth in claim 9 wherein means are provided for venting a portion of said female coupling member to atmosphere when it is disconnected from said male member.

11. A coupling as set forth in claim 9 wherein said male member has a movable sleeve thereon adapted to sealingly engage the end of said male member when it is disconnected from said female member.

12. A coupling as set forth in claim 11 wherein means are provided for locking said movable sleeve on said male member out of sealing engagement with the end of said male member when it is connected to said female member.

13. A coupling as set forth in claim 12 wherein said locking means for said sleeve on said male member comprises camming members urged into a groove by the locking means on said female member when said male and female members are connected together.

14. A coupling comprising a male member having an apertured connecting portion, and means for sealing the end thereof when disconnected; and a female member comprising an outer shell, a spaced inner shell having a laterally extending aperture, a spring-urged apertured sleeve telescopically disposed on said inner shell adapted to seal the end of said female member, and means for connecting said male and female coupling members together, said connecting portion of said male member being adapted to move said spring-urged sleeve in said female member longitudinally upon insertion thereof into said female member whereby fluid flows from said male member to said female member and vice versa through the aperture in the connecting portion of said male member and the apertures in said inner shell and said telescopically disposed, apertured sleeve thereon.

15. A coupling as set forth in claim 14 wherein the space between said sleeve and said inner shell is vented to atmosphere.

16. A coupling as set forth in claim 14 wherein said spring-urged, apertured, telescopically disposed sleeve on said inner shell comprises an apertured cylindrical member telescopically disposed on said sleeve and a cup-shaped member having an outwardly directed flange in telescopic engagement with said apertured cylindrical member.

ALBERT T. SCHEIWER.

REFERENCES CITED

The following references are of record in the file of this patent:

UNITED STATES PATENTS

| Number | Name | Date |
|---|---|---|
| 2,254,997 | Fisher | Sept. 2, 1941 |
| 2,297,548 | Fox et al. | Sept. 29, 1942 |
| 2,393,679 | Gunderson | Jan. 29, 1946 |